Dec. 13, 1949               A. J. HUCK               2,490,965
ELECTRONIC TEMPERATURE CONTROL FOR
WARMING BLANKETS AND THE LIKE
Filed Dec. 9, 1947
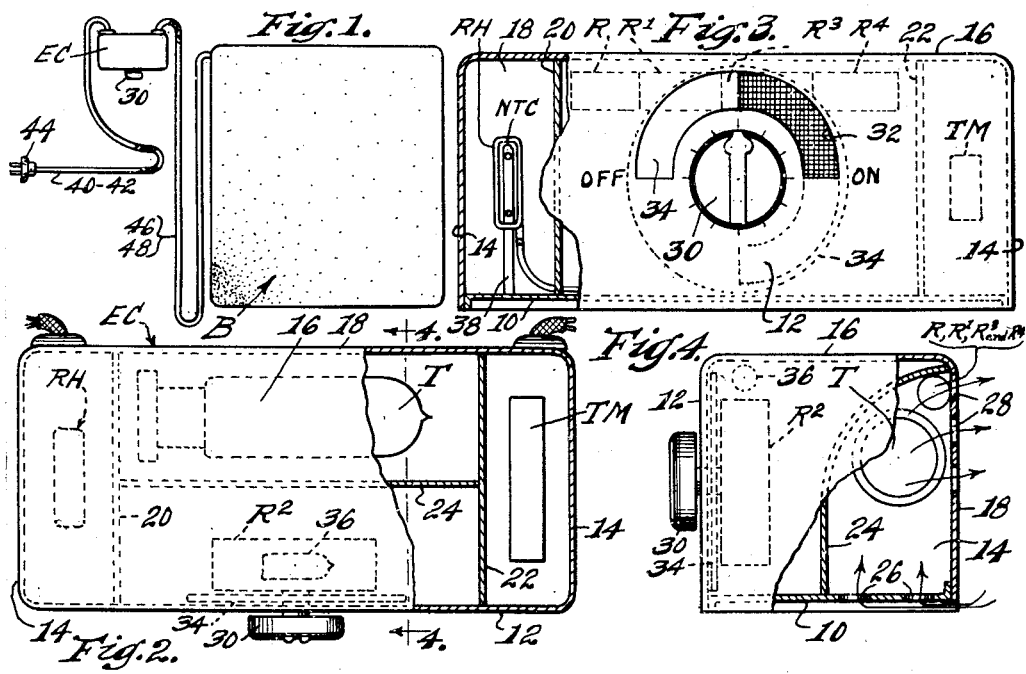
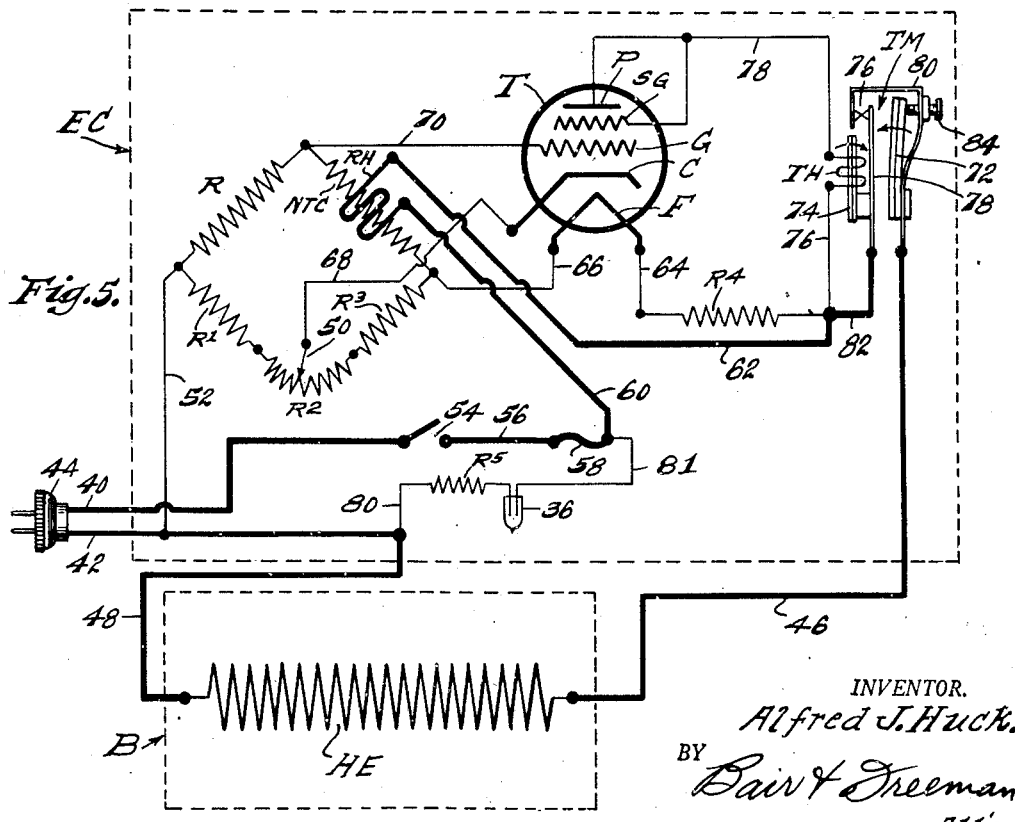
INVENTOR.
Alfred J. Huck.
BY Bair & Freeman
Attys.

Patented Dec. 13, 1949

2,490,965

UNITED STATES PATENT OFFICE 2,490,965

ELECTRONIC TEMPERATURE CONTROL FOR WARMING BLANKETS AND THE LIKE

Alfred J. Huck, St. Louis, Mo., assignor to Knapp-Monarch Company, St. Louis, Mo., a corporation of Delaware Application December 9, 1947, Serial No. 790,554

3 Claims. (Cl. 219—20)

This invention relates to an electronic temperature control device particularly adapted for warming blankets and similar electrical appliances.

It is the general object of this invention to provide an improved temperature control for appliances such as warming blankets of the cycling type in which the heating element of the appliance is alternately turned on and shut off, the relation between the periods during which the heating element is energized and the periods during which it is not energized, determining the temperature at which the appliance is held.

A more specific object of the invention is to provide a control which holds the temperature more constant than the controls heretofore employed, the sensing element of the control, in response to which the heating element is cycled on and off, being more sensitive than those heretofore employed, thus minimizing the variation of temperature of the appliance during the cycles above described.

A further object is to provide such a control with which the energy supplied to the appliance is varied with the ambient temperature.

A still further object is to provide such a control wherein the calibration of the control dial which is visible to the operator is readily preset and pre-adjusted and is held in proper correspondence with the actual blanket temperature with a minimum dependence on ambient temperature.

It is a further object to provide such a control which is quiet in operation, but yet achieves firmness of electrical contact without arcing of the contacts by which the heating element is energized.

Generally the objects of the invention are accomplished by the provision of a cycling type of temperature control in which a quietly operating thermal motor is controlled by the plate circuit of an electronic tube, the grid circuit of which includes a timing circuit having a negative temperature coefficient resistor as part thereof, the resistor being heated by a heater that is in the circuit of the heating element of the blanket and the thermal motor controlling the supply of current to the heating element and the heater. The negative temperature coefficient resistor periodically triggers the electronic tube to alternately energize the heater of the thermal motor with sufficient plate current to open the contacts and reducing the current therein to such a point that it is negligible and permits the thermal motor to cool down and the contacts to close.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a plan view of a warming blanket with my electronic temperature control unit connected therewith.

Figure 2 is an enlarged plan view of the control unit partially in section.

Figure 3 is a front elevation thereof partially in section.

Figure 4 is an end elevational thereof partly in section, and

Figure 5 is an electro-diagrammatic view illustrating the circuit connections through the control to the heating element of the blanket.

On the accompanying drawings I have used the reference character B to indicate in general a warming blanket, heating pad or the like and EC my electronic control unit therefor. The unit EC comprises a base 10 and a housing thereon having a front wall 12, end walls 14, a top wall 16 and a back wall 18. Within the housing I provide a pair of partitions 20 and 22 that serve as heat baffles, and a third partition 24 which is curved and serves as a heat reflector. Provision is made for air circulation back of the reflector 24 as by perforations 26 in the base 10 and perforations 28 in the back wall 18. In Figure 4, arrows serve to show the circulation, the purpose of which will hereinafter appear.

Within the housing in front of the baffle 24 I provide a potentiometer R2 having an adjusting knob 30. The knob 30 may cooperate with a curved slot 32 to indicate temperature settings and has within the housing a disc 34, a portion of which is opaque and another portion of which is translucent to indicate the setting of the electronic control EC in cooperation with a signal light 36 arranged back of the disc 34 in the manner illustrated in my copending application, Serial No. 746,460, filed May 7, 1947.

Within the compartment at the left of the heat baffle 20 I provide a negative temperature coefficient resistor NTC. This may be supported in any suitable manner as by a supporting leg 38. A heater for this resistor is wound around it, the heater being indicated at RH.

Located in the compartment to the right of the heat baffle 22 is a thermal motor type of relay TM. Within the compartment behind the heat reflector 24 is an electronic tube T and a plurality of resistors R, R1, R3, and R4. Referring to Figure 1, a supply cord 40—42 extends from a service plug 44 into the electronic temperature control EC and a cord 46—48 extends from the control to the blanket B. Referring to Figure 5, it will be noted that the wires 46 and 48 are connected with a heating element HE within the blanket.

Within the electronic control the tube T has the usual filament F, cathode C, grid G, screen grid SG and plate P. This is a tetrode tube but with the screen grid connected to the plate it operates substantially the same as the usual triode amplifier.

The circuit connections between the various elements are illustrated in Figure 5, the resistors R, R1, R2, R3 and NTC being connected in a Wheatstone bridge circuit, the movable blade 50 of the potentiometer dividing the resistor R2 so that one portion of it is in one leg of the bridge with the resistor R1 and the rest of it is in another leg of the bridge together with the resistor R3.

Current is supplied to the Wheatstone bridge from the wire 52 at the point between the resistors R and R1 and from the wire 40 to a point between the resistors NTC and R3 through a control switch 54, a wire 56, a fuse or overload switch 58, a wire 60, the resistor heater RH, a wire 62, the resistor R4, a wire 64, the filament F and a wire 66. The potentiometer blade 50 is connected by a wire 68 with the cathode C and the remaining point on the bridge between the resistors R and NTC is connected by wire 70 with the grid G. The switch 54 is preferably connected with the knob 30 so that the switch is open at the counter-clockwise limit of movement of the knob and closed as soon as the knob is moved clockwise away from this position.

The thermal motor TM comprises a pair of bimetal elements 72 and 74, the element 72 being for the purpose of compensating for ambient temperature and the element 74 being a timing element as will be more fully explained below. The thermal motor further includes contacts 76 one of which is carried by a spring blade 78 and the other by a spring blade 80. The blades 78 and 80 are connected by a wire 82 to the wire 62 and to the wire 46, respectively. The blade 80 is adjustable relative to the bimetal element 72 by means of an adjusting screw 84.

A thermal heater TH is provided for the bimetal element 74 and is connected by wires 76 and 78 to the wire 62 and to the plate P and screen grid SG of the tube T, respectively. The signal bulb 36 may be a small neon tube connected across the line with a resistor R5 in series with it. The resistor, it will be noted, is connected to the wire 42 and the bulb is connected to the fuse 58 by wires 80 and 81, respectively. Thus the signal light is in the circuit only when the switch 54 is closed.

*Practical operation*

The switch 54 may be considered a manual power switch. When it is closed line current flows through the blanket heating element HE by way of the following elements: from wire 40 through 54, 56, 58, 60, RH, 62, 82, 78, 76, 80, 46, to the heating element and from the heating element through 48 to 42. The potentiometer blade 50 is adjusted for the desired control temperature setting.

Assuming for instance a medium temperature setting (the knob 30 in Figure 3 and the blade 50 in Figure 5 being at this setting) the sequence of operation is as follows: As the blanket B starts to heat, the resistance in the resistor NTC is high because of the negative temperature co-efficient character of a resistor of this type. This biases the grid G negatively with respect to the cathode C in the tube T resulting in low tube current (from the cathode C to the plate P) and this of course represents the supply of current for the thermal heater TH. The amount of current is negligible so that the bimetal element 74 deflects only a negligible amount and not sufficiently to open the contacts 76.

The tube T acts as a half-wave rectifier in addition to its function as a power amplifier. On alternating current input the tube does not conduct when the plate is negative with respect to the cathode but only when the plate is positive. When the plate is positive with respect to the cathode then the grid at this stage is negative and the tube conducts only slightly. Should the grid become more positive in respect to the cathode however the output power or the value of the plate current increases.

The primary function of the tube T is to amplify the feeble signal produced in its grid or input circuit by the temperature-resistance characteristics of the heat sensitive resistor NTC. This amplification results in a relatively large change in plate current flow sufficient to operate the thermal motor TM on the output or load side of the tube. The amplification afforded by the tube makes the control unit considerably more sensitive than if the resistor NTC is used to control the thermal motor directly, and the amplifier stage makes possible a radical reduction in the heating of the resistor NTC caused by its own resistance heating effect. Accordingly, with the present arrangement the resistor NTC is more accurately responsive to either a true or simulated ambient temperature condition.

Illustrative of the resistance change which may be obtained is one specific construction in which the resistance heater RH and the resistor NTC are selected so that the resistor NTC is heated to about 210° F. and at that temperature its resistance drops to about 190 ohms compared to 1750 ohms at 70°. Other types having different characteristics and heated to different temperatures can be used, the values given being merely illustrative.

At the low (or hot) value of resistance in the arm of the bridge circuit containing the resistor NTC the grid voltage rises to a point sufficiently less negative with respect to the cathode so that the tube output current rises to a sufficient value to generate sufficient heat in the thermal heater TH to cause the bimetal element 74 to warp toward the right (the arrow indicating its direction of movement upon temperature rise) until it opens the blanket heating element circuit at the contacts 76. These contacts are preferably platinum or the like to minimize arcing as the motion of the bimetal element 74 is relatively slow.

The separation of the contacts 76 also breaks the circuit for the NTC resistor heater RH and this heater then cools. Its rate of cooling may be much faster than that of the blanket. Thus there is maintained a cycling condition such that the thermal motor TM cycles on and off at a particular rate required for the desired blanket temperature. The speed of cycling of course may be slowed down by using larger sized NTC resistors or speeded up by using smaller ones. The larger mass of a larger resistor will react slower to temperature changes throughout the mass or metal can be added to the surface of the resistor to delay the rise and fall of its temperature in response to heat or absence of heat in the heater RH. Obviously therefore the resistor NTC can be proportioned to give the desired rate of cycling.

It will be seen that the voltage to the amplifier circuit rises when the blanket heating element is de-energized and falls when the blanket element is energized. This permits the plate voltage and therefore the wattage in the thermal heater TH to rise during "power off cycles" which feature causes the contacts 76 to separate farther once they have just opened and to close more positively once they have just closed than would be the case if such a circuit were not employed.

Proper blanket temperature calibration of the potentiometer R2 and thus of the dial disc 34 is secured by adjustment of the adjusting screw 84. This calibration is held substantially constant despite changes in room temperature by the action of the bimetal element 72. The arrow indicates a rise in ambient temperature deflecting the bimetallic element 72 toward the left thereby tending to separate the contacts 76. Accordingly additional average heat from the thermal heater TH to the bimetal element 74 is required for temperature control cycling when the room temperature drops.

In requiring additional heat the thermal motor automatically provides longer "on" cycles and shorter "off" cycles of the heating element HE. The use of the bimetal element 72 for automatically correcting for a change in room temperature is flexible in practice as the construction lends itself most readily as a design variable since its effect can be varied simply by changing the thickness and/or the position of the high expansive side of the bimetal element.

Also contributing to automatic temperature compensation is the resistor NTC itself because its resistance rises as the room cools and therefore it automatically calls for more heat and produces longer "on" cycles. The timer bimetal 74 itself also requires more heat as the room temperature drops. As the temperature control knob 30 is turned to the low heat side the grid G becomes less negative with respect to the cathode C without waiting for the NTC resistance to drop as far as is necessary with a high control setting. At the low setting therefore shorter "on" cycles and longer "off" cycle are attained.

During the operation of the entire control unit some 25 or 30 watts of heat is generated and must be radiated or convected away from the control as directly as is practical so that this heat does not interfere with the dictating ambient room temperature condition. To this end the heat baffles 20, 22 and 24 are provided to segregate the various heat generating elements of the control unit from each other.

Heat generated in the amplifier chamber back of the reflector 24 by the tube T and the resistors R, R1, R3 and R4 is prevented from interfering with the temperature sensitive element NTC in the chamber to the left of partition 20 and similarly from interfering with the thermal motor assembly TM to the right of the partition 22. The ventilating openings 26 and 28 provide effective heat dispersion outwardly to the rear of the control box which will not appreciably affect the temperature sensitive units NTC and TM.

With the disclosed type of control the wattage of the NTC heater RH and its thermal relation with the resistor NTC bear a direct relationship to the initial heat-up time of the blanket, and these characteristics must be so proportioned that the blanket temperature just reaches the intended value when the timer contacts 76 separate for the first time (immediately preceding the cycling condition). The use of platinum tipped contacts permits make and break action provides a quieter operating control unit devoid of any noise that might disturb light sleepers. Snap acting contacts for instance would produce noise that might disturb some sleepers and my arrangement is such that snap action is not necessary for the contacts.

While I have shown a resistor R4 in series with the filament F, this resistor is merely for the purpose of cutting down the current so that a 50 volt filament can be used in connection with a 110 volt supply line. This resistor may be omitted if a tube is provided which has a 100 volt filament. The resistance values of the various resistors may be varied to a considerable extent and yet secure proper operation of the circuit. Merely by way of example the resistors may have the following values:

| | Ohms |
|---|---|
| R | 1,500 |
| R1 | 38 |
| R2 | 42 |
| R3 | 40 |
| R4 | 313 |
| TH | 392 |
| RH | 1.55 |
| and | |
| HE | 60 |

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a temperature control unit, an electronic tube having a plate, a cathode, and a control grid, a resistance-bridge circuit having a temperature-sensitive resistor as one of the elements thereof and having the output terminals connected to said cathode and control grid, a thermal relay having a heater in the plate circuit of the electronic tube and having a first bimetallic strip heated by said heater and a second bimetallic strip varying the spacing between the contacts thereof in response to ambient temperature variation, and an appliance heating element and an auxiliary heating element in series with the contacts of the thermal relay and controllable thereby, said auxiliary heating element being adjacent the temperature-sensitive resistor.

2. In a temperature control unit, an electronic tube having a plate, a cathode, and a control grid, a resistance-bridge circuit having a negative temperature coefficient resistor as one of the elements thereof and having the output terminals connected to said cathode and control grid, a thermal relay having a heater in the plate circuit of the electronic tube and having a first bimetallic strip heated by said heater and a second bimetallic strip increasing the spacing between the contacts thereof in response to increase in ambient temperature, and an appliance heating element and an auxiliary heating element in series with the contacts of the thermal relay and controllable thereby, said auxiliary heating element being adjacent the negative temperature coefficient resistor.

3. In a temperature control unit, an electronic tube having a plate, a cathode, and a control grid, a bridge circuit having a temperature-sensitive resistor as one of the elements thereof and a potentiometer having a tap varying the resistance of the arms thereof and having the output terminals connected to said cathode and control grid, a thermal relay having a heater in the plate circuit of the electronic tube and having a first bimetallic strip heated by said heater and a second bimetallic strip varying the spacing between the contacts thereof in response to ambient temperature variation, and an appliance heating element and an auxiliary heating element in series with the contacts of the thermal relay and controllable thereby, said auxiliary heating element being adjacent the temperature-sensitive resistor.

ALFRED J. HUCK.

REFERENCES CITED

The following references are of record in the file of this patent:

UNITED STATES PATENTS

| Number | Name | Date |
|---|---|---|
| 1,694,264 | Hull | Dec. 4, 1928 |
| 1,776,901 | Essex et al. | Sept. 30, 1930 |
| 1,903,015 | Steerup | Mar. 28, 1933 |
| 2,035,035 | Weeks | Mar. 24, 1936 |
| 2,044,147 | Bletz | June 16, 1936 |
| 2,125,110 | Harty | July 26, 1938 |
| 2,126,398 | Knowles | Aug. 9, 1938 |
| 2,163,297 | Waage | June 20, 1939 |
| 2,195,958 | Kearsley | Apr. 2, 1940 |
| 2,234,184 | MacLaren, Jr. | Mar. 11, 1941 |
| 2,278,633 | Bagnall | Apr. 7, 1942 |
| 2,290,091 | Brown et al. | July 14, 1942 |
| 2,400,735 | Bradford | May 21, 1946 |
| 2,429,453 | Crowley | Oct. 21, 1947 |
| 2,429,475 | McNairy et al. | Oct. 21, 1947 |
| 2,439,842 | Clark | Apr. 20, 1948 |

FOREIGN PATENTS

| Number | Country | Date |
|---|---|---|
| 338,880 | Great Britain | Nov. 18, 1930 |